United States Patent [19]

Sakaji

[11] Patent Number: 4,651,277
[45] Date of Patent: Mar. 17, 1987

[54] CONTROL SYSTEM FOR A MAGNETIC DISK DRIVE UNIT

[75] Inventor: Yoshihiko Sakaji, Gunma, Japan

[73] Assignee: Sanyo Electric Co., Ltd., Moriguchi, Japan

[21] Appl. No.: 648,893

[22] Filed: Sep. 10, 1984

[30] Foreign Application Priority Data

Sep. 16, 1983 [JP] Japan ................................ 58-171795
Sep. 22, 1983 [JP] Japan ........................... 58-147043[U]

[51] Int. Cl.⁴ ........................ G06F 13/00; G11B 5/00
[52] U.S. Cl. .................................................. 364/200
[58] Field of Search ... 364/200 MS File, 900 MS File; 360/51, 135, 137

[56] References Cited

U.S. PATENT DOCUMENTS 3,865,981 2/1975 Welch et al. ........................... 360/51
4,037,257 7/1977 Chari ...................................... 360/51
4,549,262 10/1985 Chung et al. ......................... 364/200

Primary Examiner—Archie E. Williams
Assistant Examiner—William G. Niessen
Attorney, Agent, or Firm—W. G. Fasse; D. H. Kane, Jr.

[57] ABSTRACT

A control system for a magnetic disk drive unit has a central processing unit (1), a disk controller (7) and a magnetic disk drive unit (8) controlled by the disk controller (7). A clock control circuit (12) has a clock switching circuit (15) and a clock detecting circuit (16) connected between the disk controller (7) and the magnetic disk drive unit (8). The disk controller (7) operates as a function of a clock signal (19) supplied thereto from the magnetic disk drive unit (8) through the clock control circuit (12). If it happens that for some reason the clock signal (19) is not supplied for more than a predetermined period, the clock detecting circuit (16) provides a detection signal (50), whereby the clock switching circuit (15) supplies a system clock signal (3) as a clock signal to the disk controller (7) instead of the clock signal from the magnetic disk drive unit (8). Accordingly, a clock signal is continually applied to the disk controller whereby a system fault is prevented in the control system.

9 Claims, 5 Drawing Figures

CONTROL SYSTEM FOR A MAGNETIC DISK DRIVE UNIT

BACKGROUND OF THE INVENTION

1. Field of the Invention

The present invention relates to a control system for controlling a magnetic disk drive unit such as a hard disk drive unit, a floppy disk drive unit or the like. More particularly, the present invention relates to an improvement in a control system which is a computer system or the like comprising a disk controller operable to provide a function or clock signal for reading or writing data by a magnetic disk drive unit.

2. Description of the Prior Art

A computer operating as a control system to which a magnetic disk drive unit is connected, comprises generally a disk controller. The magnetic disk drive unit in such a system is controlled by the disk controller, which operates as a function of a clock signal for reading or writing data by the magnetic disk drive unit. In case of a computer system having a high speed data processing capacity of a higher degree than a medium level, a disk controller has a direct memory access (DMA) transfer function, by which data are transferred between a main storage device on the side of the computer system, namely on the host side and the disk controller when writing data into the magnetic disk drive unit or reading data from the magnetic disk drive unit. However, during the DMA transfer between the main storage device and the disk controller, a central processing unit (CPU) on the host side is in the hold state and the disk controller operates independently of the control of the CPU. On the other hand, the disk controller operates as a function of a clock signal for reading or writing data by the magnetic disk drive unit as described above. Accordingly, if a supply of the clock signal is stopped for some reason, the system remains in the state of a DMA transfer, causing a fault in the system.

In addition, generally, ir a supply of the clock signal is stopped during the writing of data into the disk by the magnetic disk drive unit, the internal operation of the disk controller consequently does not proceed and a write signal keeps being supplied from the disk controller to the magnetic disk drive unit. Accordingly, the magnetic disk drive unit remains in a write operation state, whereby erroneous data are successively written into the disk over a plurality of sectors, causing the data to be damaged.

SUMMARY OF THE INVENTION

Accordingly, a primary object of the present invention is to provide a control system improved not to cause a system fault even if the supply of a clock signal for reading or writing data by a magnetic disk drive unit to a disk controller, is stopped during the DMA transfer between the disk controller and a main storage device on the host side.

Another object of the present invention is to provide a control system capable of preventing damage of data over a plurality of sectors of a disk if a supply of a clock signal to a disk controller is stopped during the writing of data into the disk.

Briefly stated, the present invention is a control system comprising: a magnetic disk drive unit; first clock signal generating means for generating a first clock signal for reading or writing of data by the magnetic disk drive unit; a main memory; a disk controller for controlling the magnetic disk drive unit to be operated in response to the first clock signal supplied by the first clock signal generating means; a central processing unit (CPU) coupled to the disk controller and the main memory; a clock signal detecting circuit for detecting the presence or absence of the first clock signal supplied by the first clock signal generating means; and means for performing a predetermined protecting operation in response to the detection of an absence of the first clock signal by the clock signal detecting circuit.

The above stated means for performing a predetermined protecting operation comprises second clock signal generating means and a clock switching circuit for receiving the first clock signal supplied by the first clock signal generating means and a second clock signal supplied by the second clock signal generating means to make a selection between the first and second clock signals according to a detection signal of the clock signal detecting means so that either of the clock signals is supplied to the disk controller. The clock switching circuit is so constructed that the second clock signal is supplied to the disk controller instead of the first clock signal, at least for a predetermined period if the first clock signal should stop.

Accordingly, the present invention makes it possible to continue the operation of a disk controller by a second clock signal even if a supply of a first clock signal is stopped during a DMA transfer between the disk controller and a main storage device, thus preventing a fault in the control system.

In a preferred embodiment of the present invention, there are further provided means for inhibiting writing of data by the magnetic disk drive unit in response to the detection of an absence of the first clock signal by the clock signal detecting means.

Consequently, in this further embodiment, a writing operation is inhibited by the write inhibiting means immediately after the stoppage of the clock signal to be supplied by the first clock signal generating means to the disk controller at the time of writing of data into the disk and, hence, erroneous data will never be written, whereby damage of data over a plurality of sectors of the disk is prevented with certainty. Particularly, erroneous data can be prevented from being written into an ID region and accordingly it becomes possible to rewrite the data or to perform another processing operation.

These objects and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
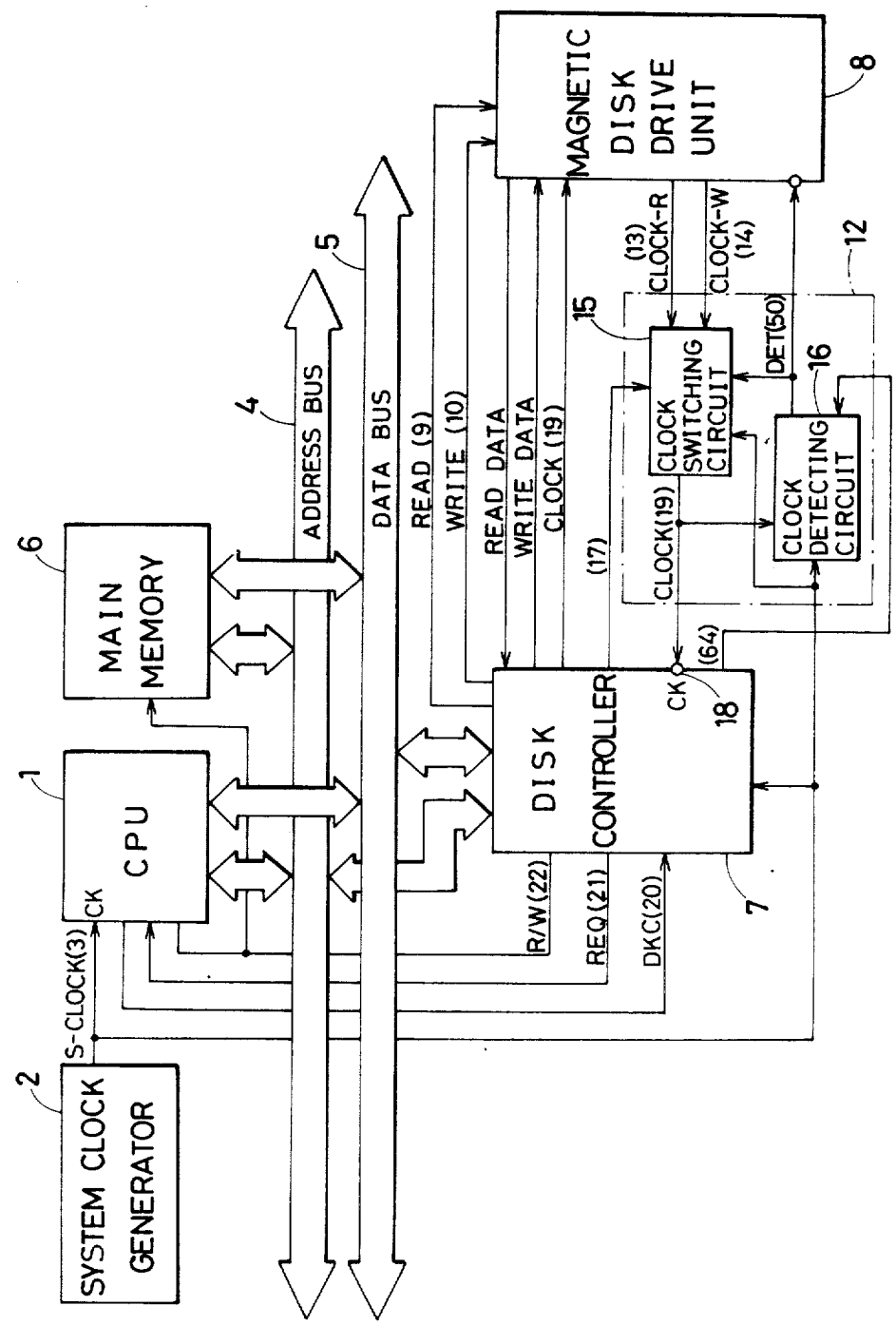
FIG. 1 is a block diagram showing the whole structure of a system of a preferred embodiment in accordance with the present invention.

Referring to FIG. 1, this system comprises a CPU 1 on the host side for controlling the whole system. A system clock signal 3 is applied to the CPU 1 by a system clock generator 2, so that the CPU 1 operates as a function of this system clock signal 3. The CPU 1 is connected with a main memory 6 through an address bus 4 and a data bus 5 for the purpose of reading and writing the data from and into the main memory 6. A disk controller 7 is connected to the CPU 1 and the main memory 6 through the address bus 4 and the data bus 5. A magnetic disk drive unit 8 is connected to the disk controller 7 as an external storage device. In this case, the magnetic disk drive unit may comprise a hard disk drive unit, wherein a read clock signal 13 and a write clock signal 14 are generated internally. The disk controller 7 supplies a read signal 9 or a write signal 10 to the magnetic disk drive unit 8 to control the magnetic disk drive unit 8 so that data may be written into or read out from the surface of a disk serving as a record medium. The disk controller 7 also operates to perform a DMA transfer of data to the main memory 6.

A clock control circuit 12 is further connected between the disk controller 7 and the magnetic disk drive unit 8. The clock control circuit 12 comprises a clock switching circuit 15 for selecting the clock signal 13 for reading or the clock signal 14 for writing, supplied by the magnetic disk drive unit 8, or the system clock signal 3 supplied by the system clock generator 2 to, and a clock detecting circuit 16 for providing a detection signal 50 indicating that the clock signal 13 or 14, to supplied by the magnetic disk drive unit 8, is not supplied in a predetermined period of time. The detection signal 50 of the clock detecting circuit 16 is applied to the clock switching circuit 15 as a clock switching signal and to the magnetic disk drive unit 8 as a write inhibiting signal in this embodiment.

The clock signal supplied by the magnetic disk drive unit 8 includes two kinds of clock signals, namely a read clock signal 13 and a write clock signal 14, as in a generally known apparatus, and in this embodiment, either clock signal is selected by the clock switching circuit 15 according to the mode selection signal 17 from the disk controller 7.

The disk controller 7 operates as a function of a clock signal 19 supplied by the clock switching circuit 15 to a clock terminal 18 and the operation of the disk controller 7 starts in response to a start signal 20 supplied by the CPU 1. When the start signal 20 is supplied, the disk controller 7 generates a request signal 21 to hold the CPU 1 and at the same time supplies the read/write signal 22 to the main memory 6 so that a DMA transfer of data may be performed to the main memory 6.

An error checking on the transferred data is also performed. The disk controller 7 applies the mode selection signal 17 as "1" at the time of reading the data from the magnetic disk drive unit 8, and applies the mode selection signal 17 as "0" in the other periods except for the writing and the reading. As a result, the read clock signal 13, on the occasion of reading, and the write clock signal 14, on the occasion of writing, are supplied to the clock signal input 18 of the disk controller 7 as a clock signal 19.

Figure 2:
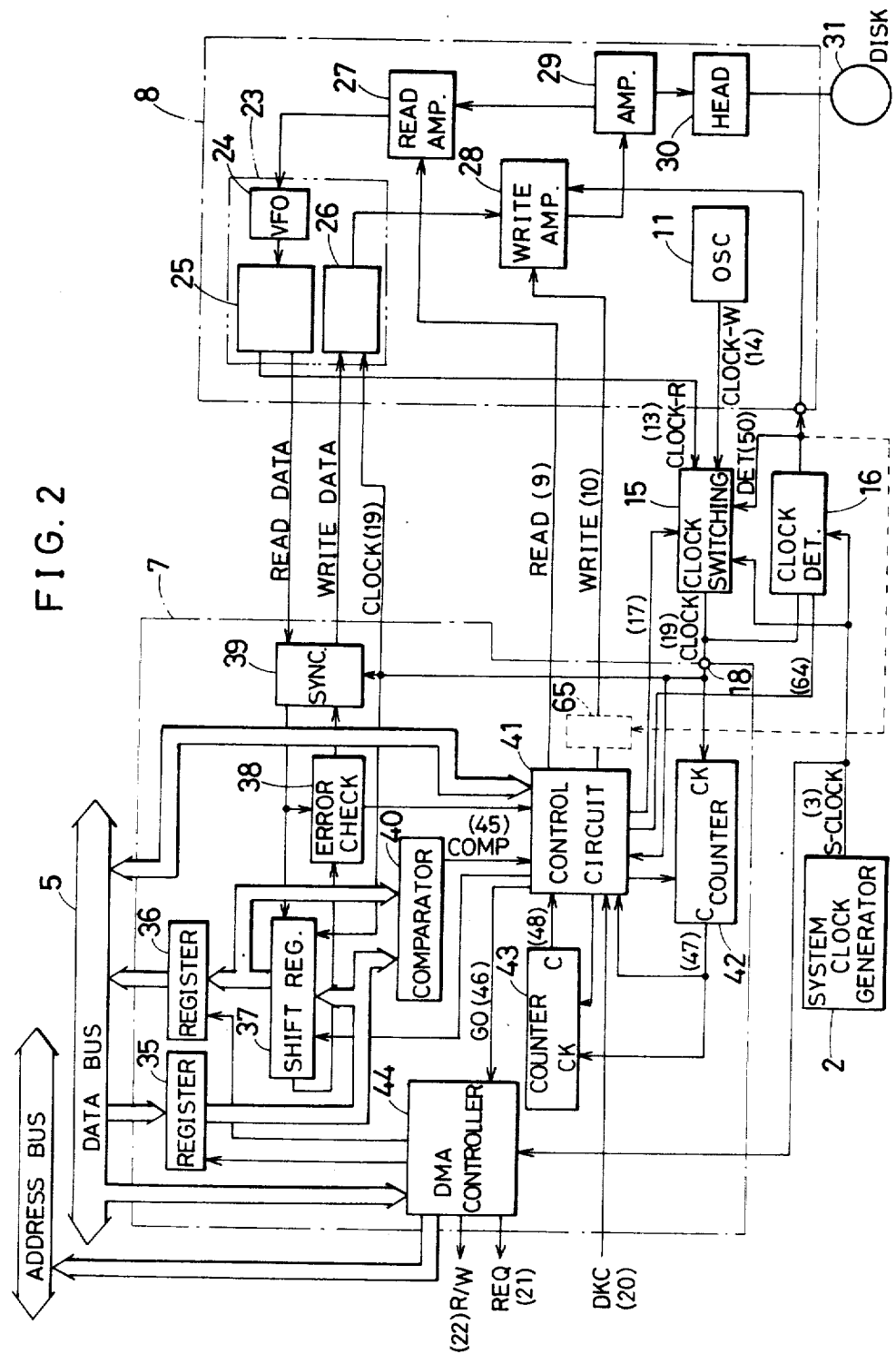
FIG. 2 is a detailed block diagram of the embodiment shown in FIG. 1.

Referring to FIG. 2, an MFM system, for example, is used for recording data onto the disk of the magnetic disk drive unit 8. A NRZ system, for example, is used for a data transfer between the magnetic disk drive unit 8 and the disk controller 7. Accordingly, the magnetic disk drive unit 8 is provided with an NRZ/MFM converting circuit 23 comprising a variable frequency oscillator 24, a data-clock separating circuit 25 for separating the data and the clock signal 13 read from the disk for reading, and a data-clock synthesizing circuit 26 for synthesizing the data and the clock signal 14 for writing when the write data are received. The magnetic disk drive unit 8 further comprises a read amplifying circuit 27 and a write amplifying circuit 28 respectively connected to the above stated NRZ/MFM converting circuit 23. A head 30 is connected to the read amplifying circuit 27 and to the write amplifying circuit 28 through a read/write amplifying circuit 29. Data is recorded and read by means of this head 30 into and from the disk 31 utilized as a record medium. The read clock signal 13 supplied by the disk drive unit 8 is generated by the data-clock separating circuit 25 and the write clock signal 14 is generated by an oscillator 11.

Figure 3:
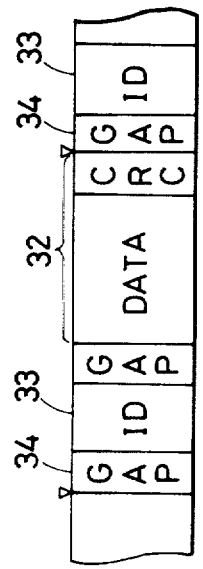
FIG. 3 is a diagram showing a format for recording into a disk.

Now, referring to FIG. 3, a format for recording of the disk 31 will be described. The disk 31 includes DATA regions 32 for recording data and ID regions 33 for recording addresses, and gaps 34 forming a boundary between the respective two regions 32 and 33. At the time of reading the data from the disk and at the time of writing the data into the disk, the numbers (addresses) recorded in the ID region 33 are determined by the disk controller 7. At the time of writing, an error check bit (CRC) is added to the data to be written in each DATA region 32 of the disk surface and this error check bit is checked at the time of reading the data so that the data may be checked.

Returning to FIG. 2, the disk controller 7 comprises a register 35 for receiving data from the data bus 5, a register 36 for sending data to the data bus 5 and a shift register 37 of one word length operable as a function of the clock signal 19 serving as a shift clock. The shift register 37 receives the data read out from the magnetic disk drive unit 8 and transfers serially the data to be written to the magnetic disk drive unit 8 at the time of writing. Between the shift register 37 and the magnetic disk drive unit 8, are connected an error check circuit 38 for checking errors in the data and a synchronizing circuit 39 for synchronization of the write/read data. The disk controller 7 further comprises a DMA controller 44 operable as a function of the system clock signal 3 for controlling a DMA transfer, a comparator 40 for comparing the contents in the ID region, a counter 42 and a word counter 43 for counting the clock signal 19 serving as a shift clock of the shift register 37 on the occasion of reading and writing for determining the amount of the data, and a read/write control circuit 41 for controlling of various operations such as sending a read signal 9 and a write signal 10 to the magnetic disk drive unit 8, supplying the GO signal 46 for commanding a DMA transfer to the DMA controller 44 and the like.

Figure 4:
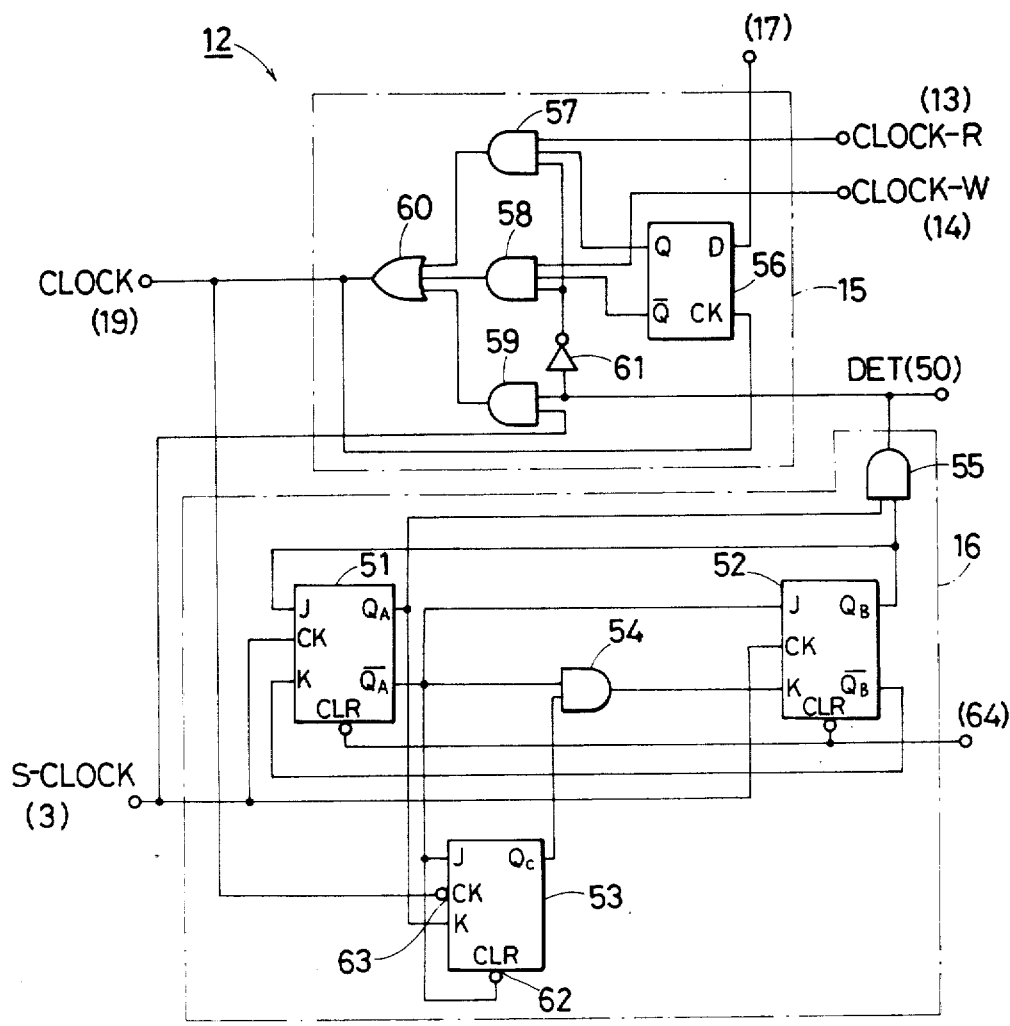
FIG. 4 is a concrete diagram of a clock control circuit.

FIG. 4 shows a specific example of a clock control circuit 12. The clock detecting circuit 16 comprises: two J-K flip-flops 51 and 52 operating as a function of the system clock signal 3; a J-K flip-flop 53 operating as a function of the clock signal 19; and AND gates 54 and 55. The clock switching circuit 15 comprises: a D-flip-flip 56 receiving the control signal 17 as data a input, AND gates 57, 58 and 59 receiving the clock signal 13, the clock signal 14 and the system clock signal 3, respectively; an OR gate 60; and an inverter 61. In the following description, the states of the J-K flip-flops 51 and 52 are indicated as A and B, respectively.

First, assuming that the states (A, B) of the J-K flip-flops 51 and 52 are (0, 0), the J input and K input of the J-K flip-flip 51 are "0" and "1", respectively, and accordingly upon receipt of the system clock signal 3, the state A of the J-K flip-flop 51 is maintained as "0" at the rise thereof. On the other hand, since the J input of the J-K flip-flop 52 is "1" and the K input as the output of the AND gate 54 is "0" or "1", the state B of the J-K flip-flop 52 becomes in either case "1" at the rise of the system clock signal 3. In other words, by application of the system clock signal 3, the states (A, B) change from (0, 0) to (0, 1). When a clock signal 19 is provided in case of the states (A, B) being (0, 0) or (0, 1), the output $Q_C$ becomes "1" at the fall of the clock signal 19 since the J input and the K input of the J-K flip-flop 53 are "1" and "0", respectively. As a result, in case of the states (A, B) being (0, 1), the output of the AND gate 54 becomes "1" and the J input and the K input of the J-K flip-flop 52 become both "1". On the other hand, since the J input and the K input of the J-K flip-flop 51 are "1" and "0", respectively, upon receipt of the system clock signal 3, the states (A, B) change from (0, 1) to (1, 0) at the rise thereof. In the states of (1, 0), the output $Q_A$ of the J-K flip-flop 51 is "0" and accordingly a clear terminal 62 of the J-K flip-flop 52 continues to receive the "0" signal, the output $Q_C$ thereof being maintained as "0". Furthermore, since the output of the AND gate 54 becomes "0", the J input and the K input of the J-K flip-flop 51 become "0" and "1", respectively, and the J input and the K input of the J-K flip-flop 52 both become "0". Accordingly, when the system clock signal 3 is applied, the states (A, B) changes from (1, 0) to (0, 0) at the rise thereof and thus the initial states are restored.

When the states (A, B) are in any of the above stated three conditions (0, 0) (0, 1) and (1, 0) the detection signal 50 as the output of the AND gate 55 is always "0". Accordingly, the system clock signal 3 is stopped by the AND gate 59 and the clock signal 13 or the clock signal 14 from the magnetic disk drive unit 8 through the AND gate 57 or 58 is provided as a clock signal 19 through the OR gate 60. More specifically, the clock detecting circuit 16 detects the generation of the clock signal 13 or the clock signal 14 when the states (A, B) are (0, 0) or (0, 1) and, if the clock signal 13 or 14 is generated normally, the clock switching circuit 15 provides as the clock signal 19, the clock signal 13 or 14 supplied by the magnetic disk drive unit 8. Thus the clock detecting circuit 16 detects whether the clock signal 13 or 14 is generated during the two cycles of the system clock 3.

Now let us assume that the clock signal 19 is not generated when the states (A, B) are (0, 0) or (0, 1).

In this case, the states (A, B) change from (0, 0) to (0, 1) in the same manner as described above. However, in the states of (0, 1), a clock terminal 63 of the J-K flip-flop 53 receives no signal and accordingly the output $Q_C$ thereof remains "0" and the output of the AND gate 54 becomes "0". As a result, when the system clock signal 3 is applied, the states (A, B) change from (0, 1) to (1, 1) at the rise thereof. Consequently, the detection signal 50 of the AND gate 55 becomes "1" and the clock signal 13 and the clock signal 14 are stopped by the AND gates 57 and 58. Instead of the clock signal 13 and 14, the system clock signal 3 is provided as the clock signal 19 through the AND gate 59 and the OR gate 60. In the states of (1, 1), the J-K flip-flop 53 is cleared in the same manner as in the states of (1, 0) and the J-K flip-flops 51 and 52 are cleared by a reset signal 64 from the disk controller 7, whereby the initial states of (0, 0) are re-established.

The mode selecting signal 17 is, as described above, a signal provided from the disk controller 7 and becomes "1" at the time of reading and "0" at the time of writing. As a result, the outputs Q and $\overline{Q}$ of the D-flip-flop 56 become "1" and "0", respectively, at the time of reading and the read clock signal 13 is provided as the clock signal 19 through the AND gate 57, while at the time of writing, the outputs Q and $\overline{Q}$ of the D-flip-flop 56 become "0" and "1", respectively, and the write clock signal 14 is provided as the clock signal 19 through the AND gate 58.

Figure 5:
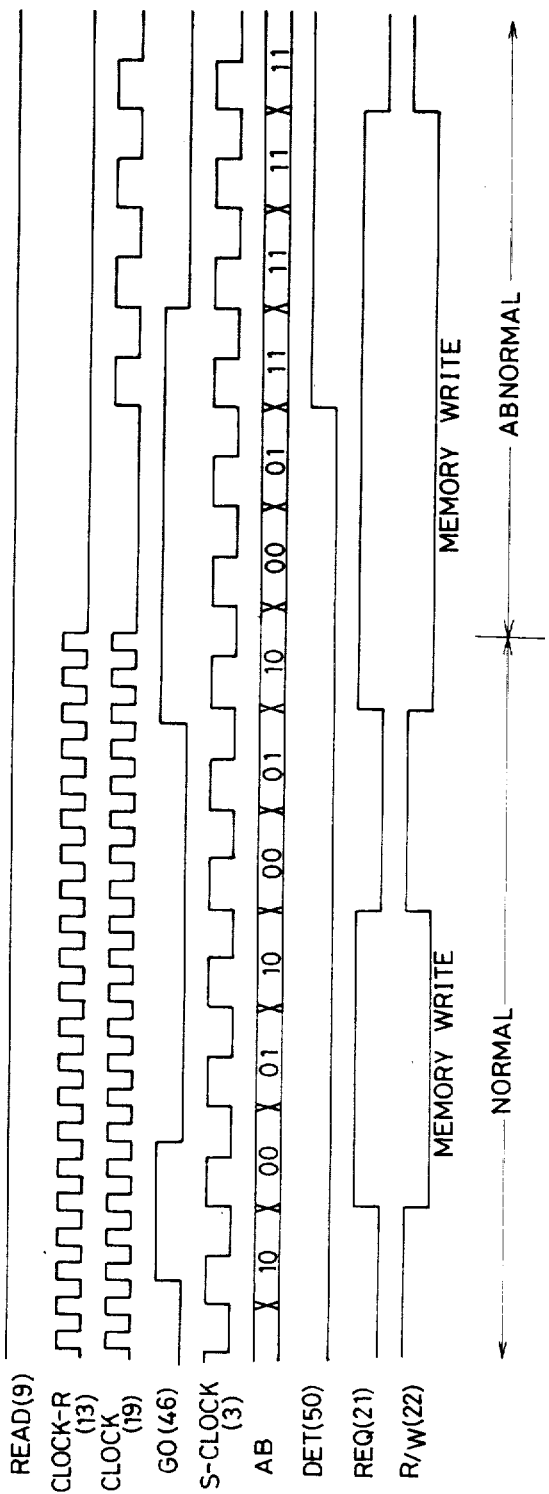
FIG. 5 is a timing chart showing the states of the signals in the embodiment of the present invention.

The timing chart of FIG. 5 shows the normal state in which the read clock signal 13 is supplied by the magnetic disk drive unit 8 and the abnormal state in which a supply of the read clock signal 13 is stopped.

Referring to FIGS. 1 to 5, now an operation will be described wherein a DMA transfer is done so that the data is read and transferred to the main memory in the embodiment shown.

In case where the data is read from the magnetic disk drive unit 8, first the CPU 1 stores in the main memory 6, the contents in the ID region 33 to be read from the disk 31 and sets, in the DMA controller 44 through the data bus 5, the address of the main memory having the contents of the ID region stored therein and the address of the main memory where the data read from the disk 31 is to be written, and further supplies through the data bus 5 a read command to the DMA controller 44 and the read/write control circuit 41 and then supplies a start signal 20 to the read/write control circuit 41.

Accordingly, the read/write control circuit 41 provides the GO signal 46 for the DMA controller 44. The DMA controller 44 being in operation as a function of the system clock signal 3 receives the GO signal at the rise of the system clock signal 3, when the GO signal 46 is supplied, whereby the request signal 21 is supplied to the CPU 1, thereby to place the CPU 1 in a hold state during that period. Then the DMA controller 44 provides the read/write signal 22 of the high level to the main memory 6, thereby to place the main memory 6 in a read state, and sends the preset address from the address bus, thereby to read the contents in the ID region to be read out of the main memory 6 so that the same may be sent to the data bus 5. Then the DMA controller 44 controls the register 35, so that the contents in the ID region transferred through the data bus 5 may be taken in.

As shown in FIG. 5, the GO signal assumes the high level for a period commensurate with four clock pulses of the clock signal 13 and the request signal assumes the high level for a period commensurate with the four clock signals of the system clock signal 3, after the GO signal is received, in which case, since the output assumes the low level unless the GO signal is at the high level, the DMA transfer is terminated, whereby the hold state of the CPU is released.

On the other hand, since the read/write control circuit 41 supplies the reading signal 4 to the magnetic disk drive unit 8 when the start signal 20 is supplied, the read amplifier 27 is operated and the contents in the ID region of the disk 31 are read out, whereupon the same are separated into the data and the reading clock 3 at the NRZ/MFM converting circuit 23 and the data, i.e. the contents in the ID region are taken into the shift register 37 in response to the reading clock signal 13. The contents in the ID region read into the shift register 37 and the contents in the ID region read into the register 35 are compared by means of the comparator 40 and, upon coincidence thereof, a coincidence output 45 is provided to the read/write control circuit 41. When the coincidence output 45 is supplied, the read/write control circuit 41 supplies continually the read signal 9 to the read amplifier 27, whereby the read amplifier 27 continues the operation. Therefore, the data is in succession read out of the disk and, after the same are separated into the data and the read clock signal 13 in the NRZ/MFM converting circuit 23, the data is taken through the synchronizing circuit 39 into the shift register 37 as a function of the reading clock signal. At that time, error checking is done in the error check circuit 38.

The counter 42 may be a counter of one word length for counting the clock signal 19 in the same manner as the shift register 37 so that a carry signal 7 is generated when one word is reached and the same is controlled by the read/write control circuit 41 to be in synchronism with the shift register 37. Therefore, when the data of one word is taken into the shift register 37, the counter 42 provides a carry signal 47.

When the carry signal 47 is provided, the read/write control circuit 41 provides again the GO signal 46 to the DMA controller 44. Therefore, the DMA controller 44 provides similarly the request signal 21 to the CPU 1 to place the CPU 1 in a hold state and also provides the read/write signal 22 of the low level to place the mean memory 6 in the write operation state, thereby to provide through the address bus to the main memory 6 the address of the main memory for storing the data read from the magnetic disk drive unit 8. Then the data of the shift register 37 is taken in the register 36 and the same is transferred through the data bus to the main memory 6. Accordingly, it follows that the data read from the disk 31 is stored at a predetermined address of the main memory. In this case also, the GO signal and the request signal are provided for a period commensurate with a predetermined number of clock signals of the respective clock signal 19 and the system clock signal 3 and, after a DMA transfer, the hold state of the CPU is released.

Likewise, the data read from the disk 31 is stored in the main memory 6 through a DMA transfer via the shift register 37. However, since the disk controller 7 comprises a word counter 43 for counting the carry signals 47 generated by the counter 42 as a clock signal for generating a carry signal 48 when the data limit of one sector is reached, the read/write control circuit 41 stops providing the read signal 9 when the carry signal 48 is generated, thereby to terminate the reading of the data from one sector of the disk 31. The error check circuit 38 checks the CRC bit upon termination of the transfer of the data of one sector, thereby to check the data as transferred, whereupon the result is notified to the read/write control circuit 41. Since the hold state of the CPU 1 has been released at the time when the read operation of the data is terminated, the error check result notified to the read/write control circuit 41 is determined through the data bus 5, thereby to check whether or not there was an error in the read data. Meanwhile, the address generated by the DMA controller is successively incremented.

In the foregoing, the case was described where the read clock signal 13 is normally provided. However, assuming that the read clock signal 13 is stopped for more than a predetermined period of time for some reason, when the operation is placed in the state of a DMA transfer upon provision of the GO signal, the clock signal 19 would not be supplied to the clock terminal 18 of the disk controller 7 in a conventional system. Accordingly, in such a conventional system, the read/write control circuit 41 operating as a function of the clock signal 19 would be stopped in that state in which the GO signal 46 continues to be supplied by the read/write control circuit 41 to the DMA controller 44. As a result, the CPU 1 remains in the hold state as a function of the request signal 21 and such a conventional system would remain in the state of a DMA transfer by the DMA controller 44, causing a system fault.

On the contrary, in this embodiment of the present invention, if the clock signal 19 to be supplied by the magnetic disk drive unit 8 through the clock switching circuit 15, is stopped for more than a predetermined period, the clock detecting circuit 16 detects such stop whereby the detection signal 50 is supplied from the clock detecting circuit 16 to the clock switching circuit 15. As a result, the clock switching circuit 15 supplies as the clock signal 19, the system clock signal 3 from the system clock generator 2 to the clock terminal 18 of the disk controller 7 instead of the read clock signal 13 from the magnetic disk drive unit 8. Accordingly, the disk controller 7 continues the DMA transfer. Then, error checking of the transferred data is effected and after the checking, the hold state of the CPU 1 is released so that the CPU 1 can control again. Thus, the normal state of control by the CPU 1 is re-established in place of the state of a DMA control by the DMA controller 44.

FIG. 5 shows a state in which the clock signal 13 is stopped, when three of the read clock signals 13 are supplied after the output of the GO signal. In that case upon application of one system clock signal 3 by switching the clock signal, it follows that four clock signals in total have been supplied after the output of the GO signal, so that the GO signal assumes the low level, whereby the DMA transfer is terminated. Upon receipt of the GO signal, the request signal 21 is about to assume the low level upon application of three of the system clock signals 3; however, since the GO signal is at the high level, such high level is maintained for a period of three more cycles of the system clock signal. However, since the GO signal assumes the low level upon switching of the clock, the request signal 21 also assumes the low level thereafter, whereby the hold state of the CPU is released.

Thus, although the system clock signal 3 has a cycle different from that of the read clock signal 13 or the write clock signal 14, a clock signal of a certain kind can be applied to the disk controller 7, which enables the disk controller 7 to complete the DMA transfer. Since the system clock signal 3 is not a normal clock signal to be applied to the disk controller 7, errors will be detected at the time of error checking. Accordingly, after the error checking, it becomes possible to take any measures such as restarting of the DMA transfer for example under the control of the CPU 1, or indication of an error message bringing the system temporarily into a waiting state, whereby a system fault can be prevented.

Now in the case where the data is written in the magnetic disk drive unit 8, first the CPU 1 stores in the main memory 6, the contents in the ID region 33 where the data is to be written, then sets through the data bus 5 the address of the main memory where the contents in the ID region are stored, then stores the address of the main memory where the data to be written is stored, then provides a write command through the data bus to the DMA controller 44 and the read/write control circuit 41, and then provides the start signal 20 to the read/write control circuit 41.

Then, as in the case of reading, the contents in the ID region stored in the main memory, are subjected to a DMA transfer to the register 35, whereupon the same are compared with the contents in the ID region read from the disk 31, whereupon the data stored in the main memory 6 is taken in succession into the shift register 37 through the DMA transfer, so that the data is written in the disk 31 from the magnetic disk drive unit 8. Although the write clock signal 14 has been supplied to the clock input 18 of the disk controller 7 at that time, as in the case of the reading, since the system clock signal 3 is supplied in place of the writing clock signal by the clock switching circuit 15, even if the clock signal 14 is stopped during the DMA transfer, a system fault can be prevented.

However, as described above, the data amount of the writing data is determined by the counter 42 and the word counter 43 and, since the read/write control circuit 41 continues to provide the writing signal 10 until the carry signal 48 is provided, the writing signal 10 is kept supplied, whereby erroneous data are written in the disk 31, if and when the write clock signal 14 is stopped and the operation of the counter is stopped. Therefore, as shown in FIGS. 1 and 2, this embodiment so constructed that the detection signal 50 provided by the clock detecting circuit 16, is also applied to the write amplifying circuit 28 of the magnetic disk drive unit 8. As a result, in case where data are being written into the surface of the disk 31, if it happens that the read clock signal 13 or the write clock signal 14 is not supplied for some reason, such incident is detected by the clock detecting circuit 16 so that the write amplifying circuit 28 must be brought into the disabled state by the detection signal 50. As a result, writing of the data into the disk thereafter is inhibited. Accordingly, erroneous data can be prevented from being written over a plurality of sectors.

Although in the foregoing description of this embodiment, the detection signal 50 was directly applied to the write amplifying circuit 28, a gate circuit 65 may be provided at the output end of the write signal 10 in the read/write control circuit 41 as shown by the dotted line in FIG. 2 so that the gate circuit 65 may be controlled by the detection signal 50 to stop the supply of the write signal 10. In such a case, writing of data into the disk can also be inhibited.

Although in the above description of the embodiment, the write clock signal 14 was provided by the oscillator 11 (see FIG. 2), clock signals may be generated based on a servo signal from the servo surface of the disk 31 without using the oscillator 11.

In addition, although in the foregoing, a system to be applied to a hard disk drive unit was described, the present invention can also be applied to a floppy disk drive unit. In the latter case, since a floppy disk drive unit does not comprise such a converting circuit 23 as the first clock signal generating means nor such an oscillator 11 as shown in FIG. 2, such circuits or components need be provided on the side of the disk controller 7. However, such a modification can be easily made.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control system for a magnetic disk drive unit comprising magnetic disk drive means for reading data from and writing data into a rotational magnetic disk as a record medium, first clock signal generating means for generating a first clock signal for reading or writing of data by said magnetic disk drive means, main memory means for storing data read out of and written into said magnetic disk drive means, a central processing unit coupled to said main memory means for reading data from and writing data into said main memory means, disk control means coupled to said first clock signal generating means, to said magnetic disk drive means, to said main memory means, and to said central processing unit for controlling said magnetic disk drive means in response to said first clock signal, said disk control means including means for placing said central processing unit in a hold state, said disk control means further including means for directly transferring data between said main memory means and said disk control means, second clock signal generating means for generating a second clock signal, clock signal detecting means coupled to said first clock signal generating means for producing a detection signal indicating an absence of said first clock signal, and clock signal selecting means coupled to said first clock signal generating means, to said second clock signal generating means, and to said clock signal detecting means for supplying said second clock signal to said disk control means in response to said detection signal instead of said first clock signal.

2. The control system in accordance with claim 1, wherein said second clock signal generating means comprising means for generating a system clock signal for operating said central processing unit.

3. The control system in accordance with claim 1, wherein said clock signal detecting means comprises reference clock signal generating means for generating a reference clock signal, time measuring means coupled to said reference clock signal generating means for measuring a predetermined period of time in response to said reference clock signal, and means responsive to said time measuring means for determining the presence or absence of said first clock signal in said predetermined period of time.

4. The control system in accordance with claim 3, wherein said reference clock signal generating means comprises system clock generating means for generating a system clock signal for use in operating of said central processing unit.

5. The control system in accordance with claim 1, wherein said disk control means comprises mode selection signal generating means for generating a mode selecting signal, said first clock signal generating means further comprising read clock signal generating means coupled to said magnetic disk drive means for generating a read clock signal for reading in accordance with data read out by said magnetic disk drive means, write clock signal generating means for generating a write clock signal, and selection means responsive to said mode selection signal for selecting either said read clock signal for reading or said write clock signal for writing thereby providing the selected signal as said first clock signal.

6. The control system in accordance with claim 1, wherein said magnetic disk drive means comprises said first clock signal generating means for generating said first clock signal.

7. The control system in accordance with claim 1, further comprising write inhibiting means responsive to said detection signal for inhibiting data from being written by said magnetic disk drive means.

8. The control system in accordance with claim 7, wherein said magnetic disk drive means comprises a write amplifier, and said write inhibiting means comprises means for disabling said write amplifier.

9. The control system in accordance with claim 7, wherein said write inhibiting means comprises gate means for interrupting a write signal to be supplied from said disk control means to said magnetic disk drive means.

* * * * *